United States Patent
Schwomma

[11] 3,982,835
[45] Sept. 28, 1976

[54] INTERFEROMETRIC SYSTEM

[75] Inventor: Otto Schwomma, Schwechat, Austria

[73] Assignees: Karl Vockenhuber; Raimund Hauser, both of Vienna, Austria

[22] Filed: Sept. 3, 1974

[21] Appl. No.: 502,750

[30] Foreign Application Priority Data
Sept. 4, 1973 Austria .............................. 7655/73
Sept. 14, 1973 Austria .............................. 7953/73
Sept. 4, 1973 Austria .............................. 7656/73

[52] U.S. Cl. .......................... 356/106 R; 356/109; 356/113; 350/3.5
[51] Int. Cl.² .......................................... G01B 9/02
[58] Field of Search ................ 356/106 R, 109, 113; 350/3.5

[56] References Cited
UNITED STATES PATENTS

| | | | |
|---|---|---|---|
| 2,151,631 | 3/1939 | Williams | 356/106 R |
| 3,494,698 | 2/1970 | Neumann | 356/106 R |
| 3,596,104 | 7/1971 | Macomber | 350/96 WG |
| 3,813,139 | 5/1974 | Carlsen | 350/3.5 |

*Primary Examiner*—John K. Corbin
*Assistant Examiner*—Conrad Clark
*Attorney, Agent, or Firm*—Ernest G. Montague; Karl F. Ross; Herbert Dubno

[57] ABSTRACT

To facilitate visual and/or electronic determination of the shape of a light-reflecting test object, a source of coherent light such as a laser produces an illuminating beam and a reference beam, the latter beam being combined in an optical system with reflections of the illuminating beam from the test object to form a holographic pattern on a receiving surface. The optical system includes a main objectives and two ancillary objectives, these ancillary objectives focusing the reflected rays of the illuminating beam and the rays of the reference beam upon two substantially coincident points so located on or near the axis of the main objective, in non-conjugate relationship with the receiving surface, as to train upon that surface a defocused composite beam producing a holographic pattern of contour lines. The substantially coincident points also lie in or near the plane of a real or virtual aperture stop, such as a pinhole diaphragm or its image. Lens groups of different focal length, or a varifocal assembly, may be used as the main objective to enable full illumination of the receiving surface in different object positions; if necessary, especially with polychromatic radiation, adjustable delay means make its effective path length equal to that of the reflected illuminating beam in different object positions.

13 Claims, 17 Drawing Figures

INTERFEROMETRIC SYSTEM

FIELD OF THE INVENTION

My present invention relates to an interferometric system for visually or electronically determining the shape of a light-reflecting object, especially a test object liable to undergo minor surface deformations which are not readily ascertainable with the naked eye.

BACKGROUND OF THE INVENTION

In Austrian patent No. 298,830 there has been disclosed a system of this character, used for example in the testing of inflated automobile tires by a holographic technique, wherein a source of coherent light (e.g. a laser) generates a pair of beams, namely an illuminating beam and a reference beam. The illuminating beam is trained upon the test object from which rays of that beam are reflected onto a receiving surface such as the photocathode of a television camera. The reference beam is directed onto the same receiving surface so as to produce thereon an interference pattern due to phase differences between the rays of that beam and those reflected by the test object, the latter rays being focused upon the receiving surface by a main objective. Two ancillary objectives, traversed by the illuminating beam and the reference beam, cause their rays to diverge on their way to the test object and to the receiving surface, respectively, by focusing them upon nearby points; the diverging reference beam is then mirrored into the path of the reflected light rays between the main objective and the receiving surface. The projected image of the test object, distorted by the interference pattern, is temporarily stored for comparison with a second such image taken at a later time in order to reveal intervening changes in the position or in the shape of the test object.

The described system can also be used to produce a holographic record of the test object, yet such a record does not lend itself to evaluation by visual inspection or simple electronic means.

OBJECTS OF THE INVENTION

An important object of my present invention is to provide an interferometric system of this character in which such direct evaluation is possible.

Another object is to provide means in such a system to allow for changes in the distance between the test object and the receiving surface, e.g for the purpose of facilitating the examination of larger or smaller areas of the test object with different degrees of magnification.

SUMMARY OF THE INVENTION

A system according to one aspect of my present invention, comprising a source of coherent light for generating two beams as discussed above, includes first optical means in the path of light rays reflected by the illuminated test object and second optical means in the path of the associated reference beam, a bundle of reflected light rays being concentrated by the first optical means in a first point which at least approximately coincides with a second point onto which the reference beam is focused by the second optical means. The orientation and relative positioning of the first and second optical means are such that the bundle of reflected rays and the reference beam diverge from these more or less coincident points substantially along a common axis to strike a light-receiving surface transverse to this axis at a location remote from the real or virtual origin of the divergent rays; as will be more fully explained hereinafter, the rays intercepted by the receiving surface then form thereon a pattern of contour lines giving an indication of the shape of the illuminated side of the test object. This pattern lies at the base of a cone defined by the two substantially coincident points. The contour lines are curves whose points of intersection with any radial line have distances from the vertex which differ, from one curve to the next, by $\lambda/2$ where $\lambda$ is the wavelength of the (sole or dominant) frequency of the coherent light. The diameter of the cone base depends on the relative position of the test object, the vertex and the receiving surface; if the object distance changes, a corresponding change in the vertex position can hold this diameter substantially constant. The pattern of contour lines enables the shape of an object to be ascertained by direct visual inspection; changes in that shape can be detected visually or electronically, e.g. with interim storage as described in the above-identified Austrian patent. If contour curves successively obtained from a given object are recorded on film and their pictures are then superposed, even slight deviations will give rise to a moiré pattern facilitating the observation of minor deformations or shifts.

According to an important feature of my invention, the first optical means forms an aperture stop at the vertex point to limit the diameter of the bundle of reflected rays at that point to the extent required for satisfactory definition. If the receiving surface is the photocathode of a television camera, the diameter of the aperture stop and its spacing from that surface should be chosen in conformity with the power of resolution of the camera.

The aperture stop may be a physical element lying in the plane of the vertex point, e.g. a pinhole diaphragm. It could, however, also be constituted by the image of such a physical element as projected upon that point by some or all of the components of a main objective through which the reflected rays must pass on their way to the receiving surface; this is especially desirable where other structure, such as a reflecting mirror for the illuminating beam and/or the reference beam, is located at or near the plane of the stop. In a particularly advantageous system of this kind, the physical diaphragm is interposed between a fixed and a movable member of a varifocal lens assembly forming part of the main objective, the fixed member serving to project the diaphragm image upon the vertex point which then becomes the entrance pupil of the main objective.

The main objective may be split into two axially spaced portions, the portion closer to the test object being focused upon that object so as to project an aerial image thereof on an intermediate plane between the two portions. The second objective portion then picks up some of the rays of the aerial image and focuses them upon a point remote from the receiving surface, i.e. the aforementioned vertex point, whereby these reflected rays are again caused to diverge on their way to that surface. Since the apparent origin of the rays forming the aerial image lies at the center of the first objective portion (or, more precisely, at a nodal point thereof proximal to the second portion), the vertex point will be the conjugate of that center as seen from the second objective portion. Here, too, the presence of a diaphragm stop -- while not absolutely essential -- will be desirable in order to cut off out-of-focus marginal rays which tend to blur the projected contour lines.

According to another important aspect of my invention, the illuminating beam trained upon the test object by first optical means has a point of divergence of its rays located between the source of that beam and the object, this point of divergence substantially coinciding with a location at which a bundle of reflected rays of that beam is concentrated by second optical means. The reference beam is directed by third optical means onto a receiving surface for interference with the reflected rays to form the aforementioned pattern of contour lines, this reference beam being preferably focused substantially upon the point of divergence of the illuminating beam and thus also upon the point of concentration of the reflected-ray bundle.

In my present system the rays illuminating the test object will generally be able to reach their vertex point only upon leaving the surface of the test object at an angle of reflection which is not necessarily the negative of the angle of incidence with reference to the surface normal. The object surface, therefore, should not be a perfect reflector but should scatter the incident light in various directions, including the one desired in each particular instance. It will thus be advantageous, in the case of an object not initially satisfying this requirement, to coat the object with a suitable layer of high but omnidirectional reflectivity, e.g. a sputtered film of fine-grain metallic particles.

This mode of reflection also directs some of the incident light rays back upon themselves, a phenomenon which allows the illuminating beam to be focused by the corresponding ancillary objective upon a semireflecting mirror on the main optical axis lying in the plane of the aperture stop. Instead of a semireflecting mirror I may also use a small full reflector blanking out only an insignificant part of the reflected light rays to be collected in the aperture stop. Such a small reflector could be constituted, for example, by a silvered spot on an otherwise transparent larger disk.

A pair of monochromatic laser beams may retain their coherency over considerable distances, e.g. of several kilometers. With other types of radiation, however, significant relative phase shifts may occur if the path length of the reference beam differs substantially from that of the illuminating beam as reflected by the test object. Therefore, pursuant to another feature of my invention, the system may include adjustable delay means in the path of the reference beam to equalize the two path lengths and to compensate for changes in the object distance. Such delay means may take the form of variably spaced reflectors or, alternatively, of elongate refractive bodies of different lengths and/or optical density selectively interposable in the beam path. The refractive bodies may consist of solid material, such as glass, or of liquids sealed into cylinders with transparent ends.

A system equipped with such adjustable delay means allows the main objective to be shifted along its axis to follow the axial movements of the test object, e.g. under the control of an automatic photoelectric distance meter trained upon that object. Instead of making the main objective adjustable, I may also use a plurality of objectives of different focal lengths selectively insertable in the path of the reflected rays.

Brief Description of the Drawing

The above and other features of my invention will now be described in detail with reference to the accompanying drawing in which.

Specific Description

Figure 1:
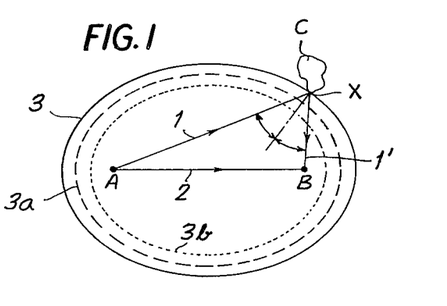
FIG. 1 is a diagram serving to explain the theoretical principles underlying my present invention.

FIG. 1 diagrammatically shows an object C upon which a beam of light is trained, this beam originating at a point A and being reflected as a beam 1' onto a point B where its phase is to be compared with that of a reference beam 2 also emanating from point A. The beams are generated by a common source of coherent light such as a laser. If the object C is displaced in such a manner that its reflecting point X moves along an elliptical curve 3 whose foci are the points A and B, the total length of the ray path 1, 1' between these points will not change so that the phase relationship between the reference beam 2 and the reflection 1' of the illuminating beam 1 at point B remains constant. Curve 3 is one of a family of ellipses, including similar curves $3a$, $3b$, etc. all with foci A and B, along which the relative phase of the two beams remains constant; if the object C moves toward the center of this family of ellipses, e.g. along the bisector of the angle 1—1', the luminous energy collected in point B will be modulated in intensity with a succession of peaks occurring whenever the reflecting point X passes an ellipse for which the ray path 1+1' differs from the distance A–B by a whole number of wavelengths $\lambda$. The successive ellipses 3, $3a$, $3b$ etc. therefore differ from one another by $\lambda$ in their path lengths A–X–B.

If the points A and B coincide, the ellipses turn into circles whose radii, therefore, differ by $\lambda/2$. In three-dimensional space we have ellipsoids of revolution and spheres, respectively.

Thus, if different reflecting points of object C are equidistant from a center coinciding with the origin A and the point of interferometric evaluation B of the illuminating and reflected rays, and if the reflections from these object points are individually evaluated with the aid of a common reference beam (e.g. by conversion of the resulting luminous energy into an electric signal), the outputs from the object points will be substantially identical. These values will not change significantly if the reflected rays are allowed to pass through the center A, B for evaluation at points remote therefrom, provided that the rays of the associated reference beam accompany them without relative phase shift to the points of evaluation. The extensions of these reflected rays beyond the center A, B will then diverge on their way to a transverse receiving surface which they intersect along a curve representing all the reflecting points of object C equidistant from center A, B. Such a curve, therefore, can be properly referred to as a contour line.

Figure 2:
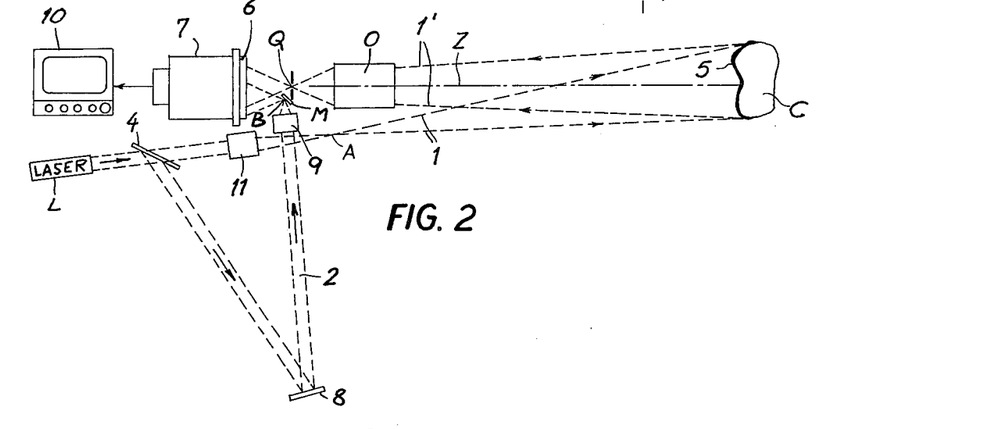
FIG. 2 is a schematic representation of an interferometric system embodying my invention.

In FIG. 2 I have shown a system utilizing the principles just outlined in the determination of the shape of an illuminated surface of a test object C, or of any changes in that shape, with the aid of a hologram produced on a receiving surface 6 here represented by the photocathode of a television camera 7 working into a receiver 10. A laser L radiates onto a semireflecting or semitransparent mirror 4 which splits the laser beam into an illuminating beam 1 and a reference beam 2. Beam 1 passes through an ancillary objective 11 which focuses its rays at A whence the beam diverges on its way to the object C whose surface confronting the camera 7 has been coated with an omnidirectionally reflecting layer 5 as discussed above. The reflections 1' of the incident rays are collected in a main objective O which concentrates them in a point Q lying on the optical axis Z of objective O in a plane P of a diaphragm 216 (see FIG. 3A). The diaphragm may be a pinhole mask allowing only a narrow bundle of these rays to pass through, as a defocused beam, to receiving surface 6.

An ancillary objective 9 receives the reference beam 2 from a mirror 8 and focuses it onto a small mirror M inclined to the optical axis Z. The focal point B of objective 9 lies on the surface of mirror M in the vicinity of point Q so that the reference beam diverging from mirror M toward surface 6 nearly coincides with the bundle of reflected rays passing the diaphragm at point Q. The sharp focusing of beam 2 onto the mirror M allows the dimensions of this mirror to be reduced to a minimum and enables it to be placed close to the vertex point Q without obstructing any significant part of the diverging ray bundle coming from objective O. The angle between the axes of objectives O and 11 is small enough to insure virtually full illumination of the object surface 5 confronting the objective O. Here the point of divergence A of the rays of illuminating beam 1 does not coincide with the area of interferometric evaluation, represented by the closely spaced points B and Q, but will be seen to be separated from that area by a small distance compared with the distance of object C.

Figure 3:
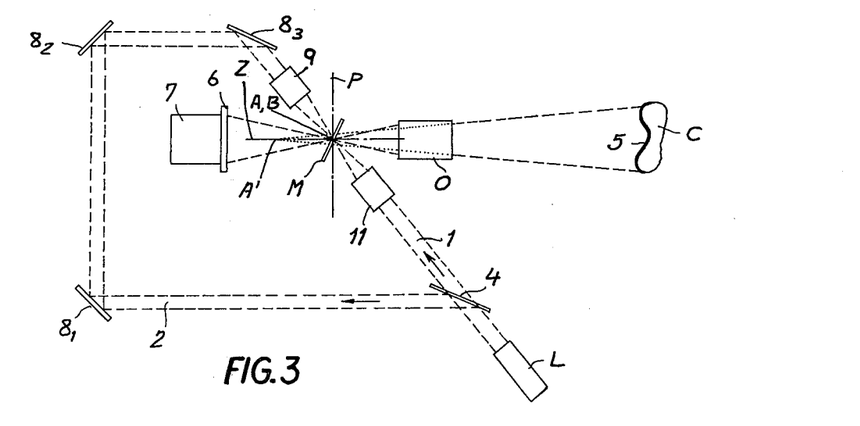
FIG. 3 is a view similar to FIG. 2, illustrating a modification.

The system shown in FIG. 3 differs from that of FIG. 2 by the use of a semireflecting mirror M onto whose surface the beams 1 and 2 are both focused by their respective ancillary objectives 11 and 9. Mirror M, which can again be very small, lies in the opening of diaphragm 216 (FIG. 3A) at an angle to the optical axis Z directing the rays of beam 1 toward objective O and those of beam 2 toward receiving surface 6.

Mirror 8 of FIG. 2 has been replaced in FIG. 3 by three separate mirrors $8_1$, $8_2$ and $8_3$ directing the reference beam 2 from beam splitter 4 onto ancillary objective 9.

Figure 3A:
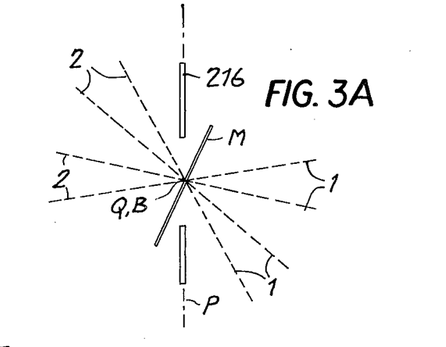
FIG. 3A is an enlarged detail view of part of FIG. 3.

The illuminating rays impinging from objective O upon object surface 5 diverge at a lesser angle than those reaching that objective from a vertex point A (here precisely coinciding with point B), appearing to originate at a point A' which is the conjugate of point A with reference to objective O. If the focal point of this objective coincides with point A, its conjugate point A' moves out to infinity so that the rays striking the surface 5 are parallel to the axis Z; in that case, an axial displacement of test object C will give rise to successive holograms on surface 6 in which the shift of the contour lines is representative of the change in the object distance. In FIGS. 3 and 3A, as well as in subsequent Figures described hereinafter, point A, B also coincides with a location (point Q in FIG. 2) at which the bundle of reflected rays coming from object C is narrowly concentrated on its way to receiving surface 6.

In the system of FIGS. 3 and 3A it will also be possible to replace the semitransparent mirror M by a small opaque mirror, similar to that shown in FIG. 2, which is offset from the optical axis Z and onto which the beam 2 is focused in the vicinity of vertex point A.

Figure 4:
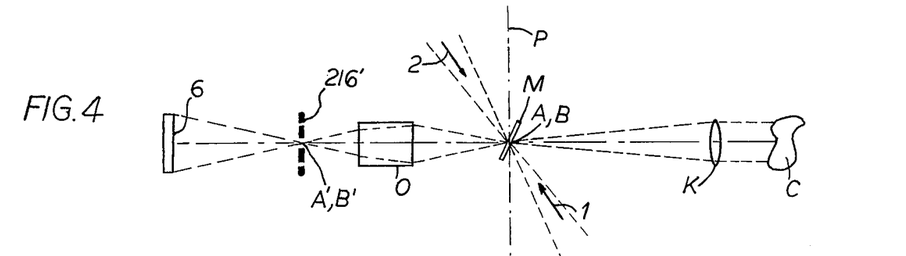
FIGS. 4–7 are diagrammatic representations of other embodiments, a modification of the system of FIG. 5 being shown in FIG. 5A.

In the embodiment of FIG. 3, the rays of reference beam 1 traverse the objective O twice, i.e. on their way to the object C and after deflection at its surface 5. This entails a certain loss of intensity which can be obviated by an arrangement as shown in FIGS. 4–7 where the deflecting mirror for the incident illuminating beam 1 is positioned between the objective and the test object C. In FIG. 4 the illuminating and reference beams 1 and 2 are again focused by their respective ancillary objectives (not shown in these Figures) upon a common point A, B on mirror M within a diaphragm plane P. A point A', B' conjugate to point A, B, at the center of a diaphragm 216' imaged by the objective O in plane P, constitutes the vertex of the divergent composite beam impinging upon receiving surface 6.

A collimator K is shown interposed between mirror M and object C to focus the incident illuminating beam on infinity, in the manner described above for the objective O of FIG. 3.

In the system of FIG. 4 the reference beam 2 must traverse the objective O and may therefore be affected by optical imperfections, dust particles or gas occlusions in its lens system which could give rise to objectionable distortion of the holographic pattern projected onto surface 6. This problem is obviated in the system of FIG. 5 wherein the single mirror M has been replaced by two mirrors $M_1$ and $M_2$, again of the semitransparent type, respectively serving to deflect the illuminating beam 1 and the reference beam 2 into the axial direction of objective O. In this instance the ancillary objective 11 associated with beam 1 has a focal point A ahead of mirror $M_1$, with a conjugate point A' as seen by objective O between the latter objective and the receiving surface 6. Ancillary objective 9 focuses the reference beam 2 onto a point B, coinciding with the image A' of focal point A, after deflection of that beam by mirror $M_2$. The plane P containing the diaphragm 216 passes through the vertex point A', B which in this case is not obstructed by any other physical element.

Figure 5:
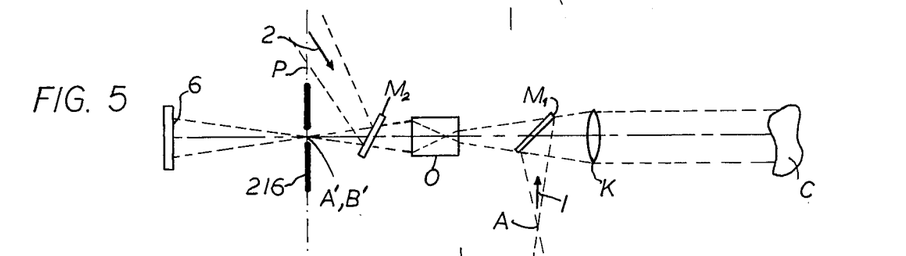
Figure 5A:
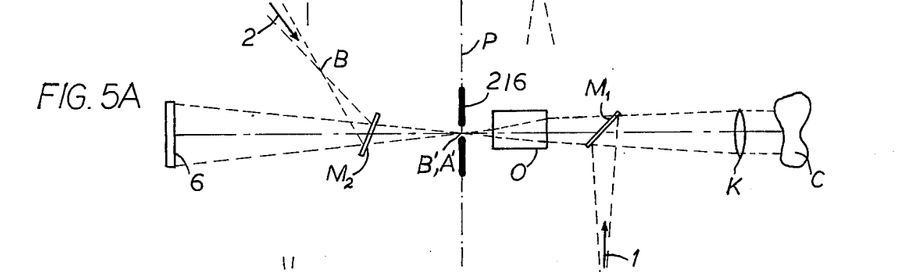

In FIG. 5A I have shown a modification of the system of FIG. 5 in which the reference beam 2 is focused upon a point B ahead of mirror $M_2$ having a virtual image at a point B' which is also the image A' of the focal point A of ancillary objective 9. Diaphragm 216 can again be easily accommodated in a plane P passing through the vertex point A', B' which is free from interfering structure.

Figure 6:
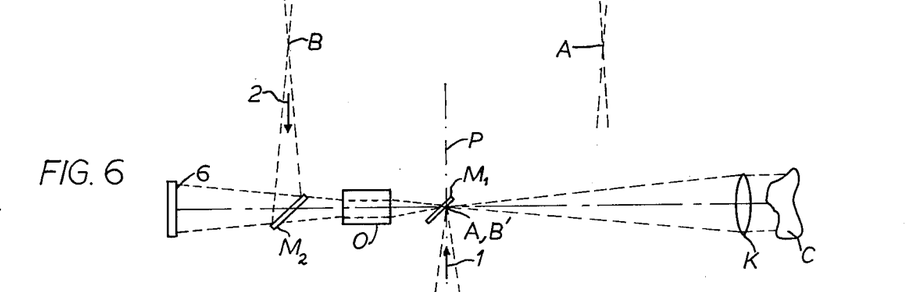

In the embodiment of FIG. 6 the virtual image B' of point B, produced by mirror $M_2$ and objective O, coincides with the focal point A of beam 1 on the surface of mirror $M_1$ which in this case can again be made very small so as to accommodate a diaphragm in the plane P passing through that point.

Figure 7:
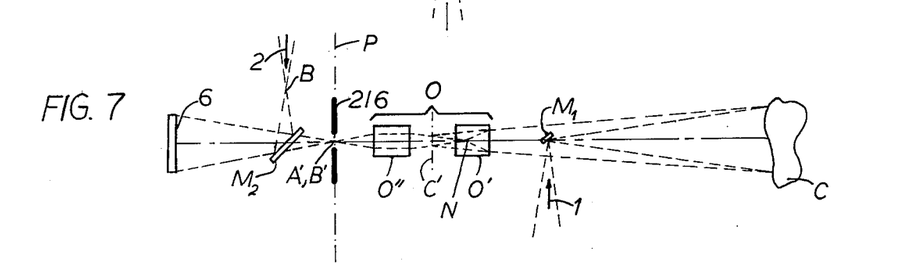

FIG. 7 depicts a particularly advantageous arrangement in which the objective 0 has been split into two axially spaced portions O' and O''. Mirror $M_1$, which is here shown as a small opaque reflector though of course a semitransparent element as shown in FIGS. 5 and 5A could also be used, receives the illuminating beam 1 which is focused upon its surface. The rays of that beam reflected by object C are intercepted by the first objective portion 0' which projects an aerial image C' of object C in a plane intermediate the two objective portions O' and O''. Some of the rays forming that image, originating at a nodal point N of objective portion O' proximal to objective portion 0'', are concentrated by objective portion O'' upon a point A' which is the conjugate of nodal point N as seen by objective portion O''. Point A', lying in a diaphragm plane P, coincides with the virtual image B' of focal point B produced by mirror M. Here, too, the diaphragm 216 is positioned at a vertex point A', B' in an otherwise unobstructed region.

Figures 8, 9:
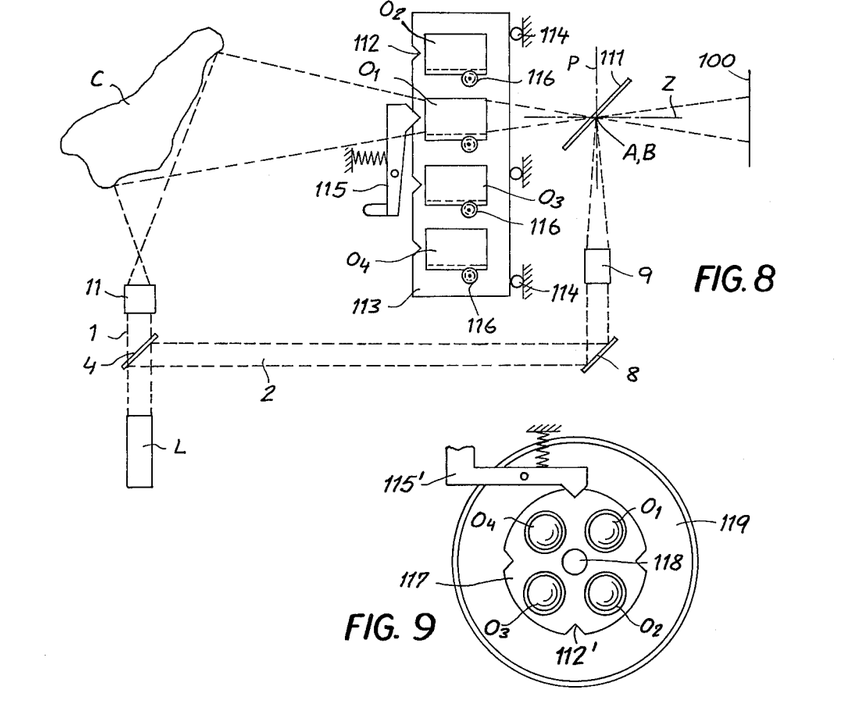
FIG. 8 shows a system generally similar to that of FIG. 3, including a movable support for a plurality of objectives viewed from the side.
FIG. 9 is a face view of an alternate multi-objective support.

Reference will now be made to FIG. 8 which shows a system basically similar to that of FIG. 2, except that the single main objective 0 thereof has been replaced by a set of objectives $O_1 - O_4$ mounted on a O support 113 for selective insertion in the optical axis Z of the system. Support 113 is a slide guided in ball bearings 114 and provided with notches 112 which are engageable by a spring-loaded pawl 115 for releasably indexing that slide in any one of its four operating positions. Objectives $O_1 - O_4$ are of different focal lengths and are individually focusable by manually operated rack-and-pinion drives 116 to project a hologram of suitable size upon a receiving surface 100 which may be a viewing screen or a photocathode, as in preceding embodiments. With the aid of a suitable aperture stop, such as a diaphragm 216 as shown in FIG. 3A or the image of such a diaphragm (e.g. as discussed below with reference to FIG. 10), the reflected light rays traversing the operatively positioned objective -- here element $O_1$ -- are concentrated in a point A, B of a semitransparent mirror 111 onto which the reference beam 2 is also focused by ancillary objective 9. The system operates otherwise in the aforedescribed manner.

FIG. 9 shows a modified objective support 117 in the form of a rotatable turret, with peripheral notches 112' engageable by an indexing pawl 115', which carries the four objectives $0_1 - O_4$ of different focal lengths. The turret shaft 118 is offset from the optical axis of the system to allow again any one of these objectives to be aligned with that axis.

Figure 10:
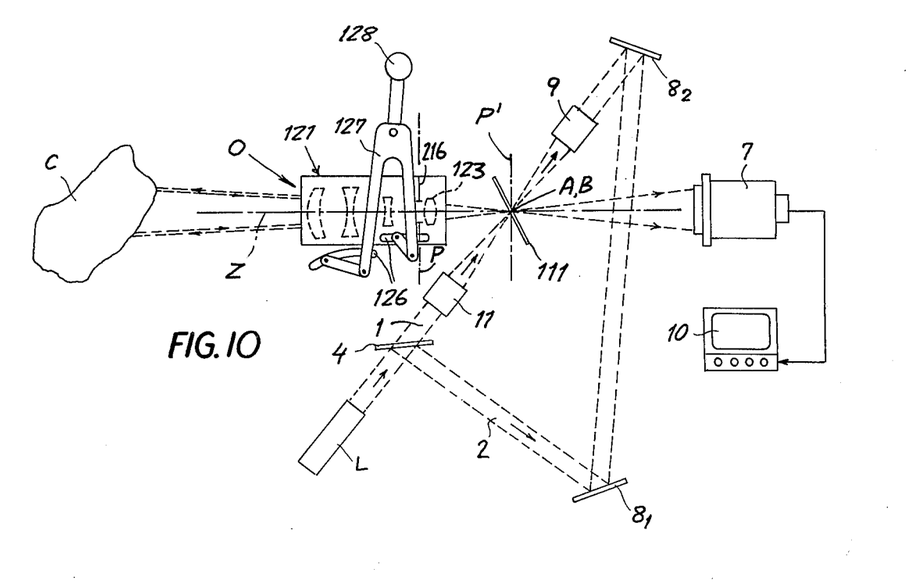
FIG. 10 is a view similar to FIG. 8, showing a varifocal objective.

FIG. 10 shows a system generally similar to that of FIG. 3, with a main objective 0 including a varifocal lens group 121 of conventional four-component type whose two inner lens members are axially shiftable over a predetermined zoom range under the control of an actuator 127 provided with a handle 128. The axial displacement of these two negatively refracting inner members is controlled by a pair of cam slots 126 in a manner known per se and not further illustrated.

On the object side of the stationary fourth component 123 of lens assembly 121, in a plane P, a diaphragm 216 constricts the bundles of incident and reflected light rays of illuminating beam 1 passing back and forth between the objective O and the object C. Again, the beams 1 and 2 are focused by ancillary objectives 11 and 9 upon a vertex point A, B ahead of the receiving surface of a television camera 7 working into a receiver 10. Beam 2 is deflected by two mirrors $8_1$ and $8_2$ on its way from beam splitter 4 to objective 9.

The fixed focal length of component 123 is so chosen that the image of diaphragm 216 appears in the plane P' containing the vertex point A,B.

Figure 11:
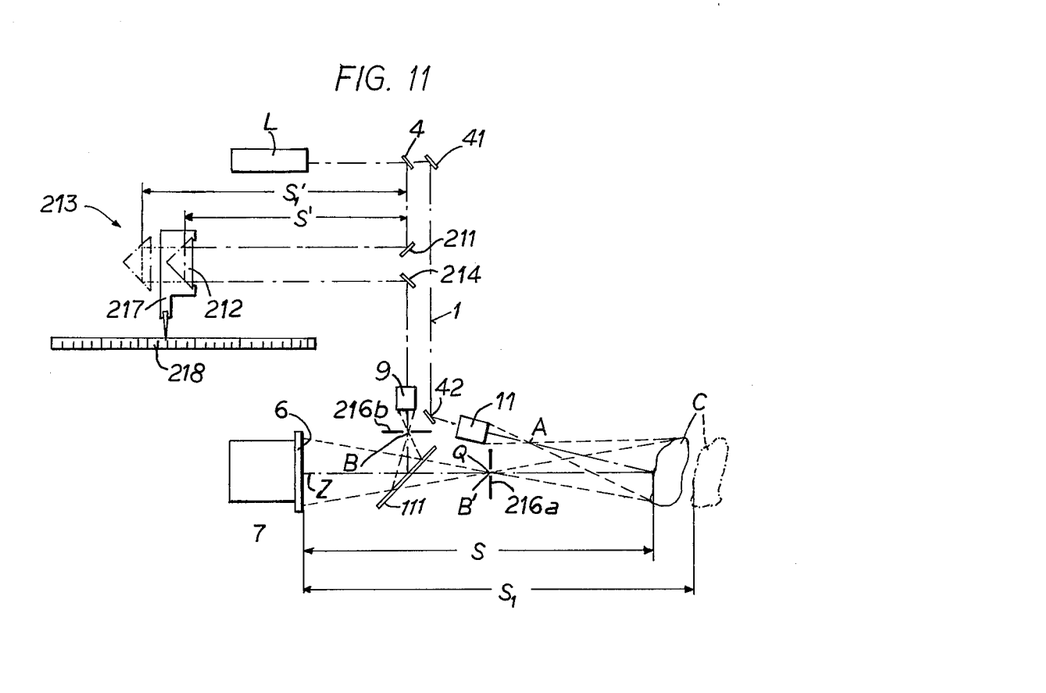
FIG. 11 diagrammatically illustrates another embodiment, including adjustable optical delay means.

For the reasons described hereinabove, the path of the reference beam 2 may have to be artificially lengthened by the interposition of preferably adjustable optical delay means. FIG. 11 shows a system of this nature which is basically similar to that of FIG. 6, except for omission of the main objective 0; the semitransparent mirror 111 forms a virtual image of the focal point B of ancillary objective 9 at a point B' upon the optical axis Z, this point B' being also the vertex Q for the rays of the illuminating beam 1 which are trained upon the object C at an acute angle to axis Z in the same general manner as in FIG. 2. The bundle of reflected rays is constricted at point Q, B' by a diaphragm 216a, a similar diaphragm 216b being disposed at the focal point B of objective 9 for more sharply circumscribing the reference beam coming from beam splitter 4. The illuminating beam 1, downstream of this beam splitter, is deflected by a pair of further mirrors $4_1$ and $4_2$ before reaching the objective 11 which again has a focal point A off the main axis Z but relatively close to point Q B'.

The object C is spaced from receiving surface 6 by a variable distance $s$ which is to be compensated by an optical delay circuit 213 comprising a pair of deflecting mirrors 211, 214 confronting a prism 212. This prism is carried on a slidably mounted holder 217 which has a pointer sweeping along a distance scale 218; the prism holder 217 may be guided, for example, on a rail which it engages with a dovetail fit and to which it may be clamped in any chosen position. Displacement of this holder along scale 218 shortens or lengthens two sections of the ray path, between mirrors 211, 214 and prism 212, which are parallel to each other so as not to affect the angle of incidence of beams 2 upon objective 9. If, for example, the object C is moved from a distance $s$ (full lines) to a larger distance $s_1$ (phantom lines), prism 212 is similarly shifted from a distance s' (as measured from the axis of objective 0) to a distance $s_1'$, again as shown in full and phantom lines respectively.

Figure 12:
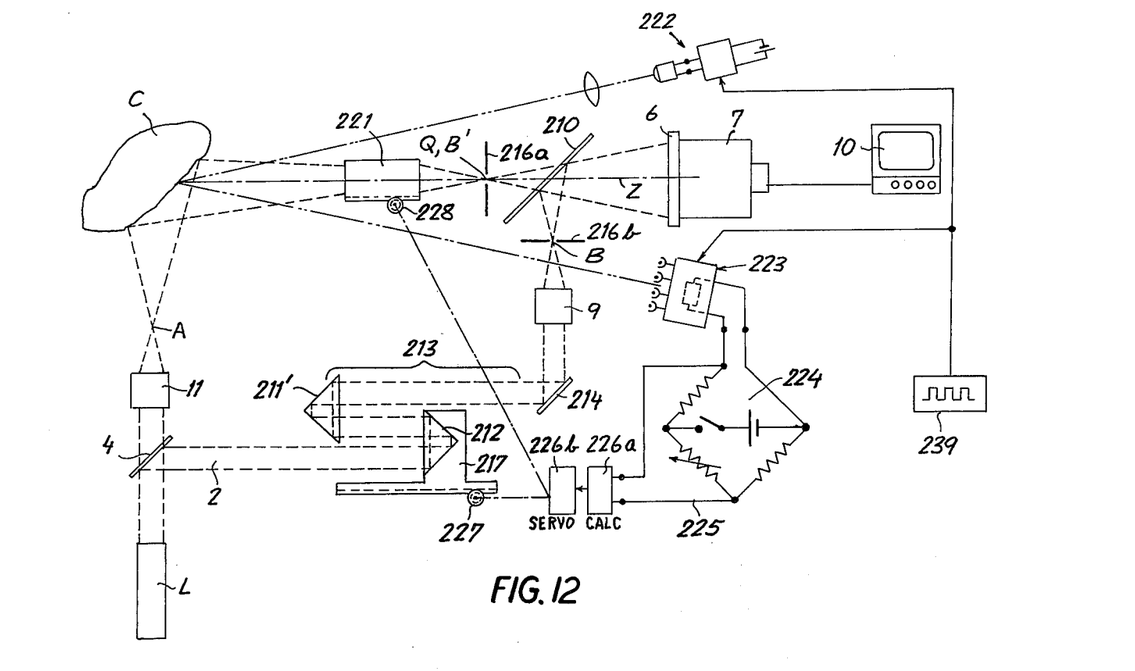
FIG. 12 shows a system generally similar to that of FIG. 11, provided with optical delay means and with a photoelectric distance meter coupled thereto.

FIG. 12 shows the optical delay circuit 213 of FIG. 11 incorporated in a more elaborate interferometric system including a main objective 221 which is focusable with the aid of a rack-and-pinion drive 228. A diaphragm 216a between objective 221 and a semitransparent mirror 210 again defines a vertex point Q coinciding with the image B' of focal point B of ancillary objective 9, this focal point lying in the aperture stop of a diaphragm 216b.

The effective distance between receiving surface 6 and object C is measured by a photoelectric device which may be similar to one described in Austrian Pat. No. 301,331 and which comprises a fixedly positioned emitter 222 of a pulsed light beam (e.g. a laser) periodically energized by the output of a square-wave generator 239. Reflections of these luminous pulses at object C are detected by a photoelectric receiver 223 to which a reference voltage is fed from generator 239. Changes in the object distance, within a range determined by the pulse frequency of this generator, manifest themselves in relative phase shifts between the reference signal and the photocell output of receiver 223 whereby, upon superposition of the two voltages waves, a threshold circuit will detect pulses of a width depending on the relative phasing of these waves. The integrated magnitude of the latter pulses can then be compared with a reference voltage in a bridge circuit 224 feeding a calculating stage 226a which derives therefrom a control signal for a servomotor 226b operatively coupled with prism drive 227 and focusing drive 228. This system, therefore, automatically compensates for any axial displacement of object C relative to camera 7.

The stationary mirror 211 of FIG. 11 has been replaced in FIG. 12 by a second prism 211'. As indicated in FIG. 13, two confronting prisms 211' and 212' can be so juxtaposed that the reference beam 2 is reflected a large number of times between them, along parallel path sections, which results in a more compact design of the optical delay circuit for a given path length.

Figure 13:
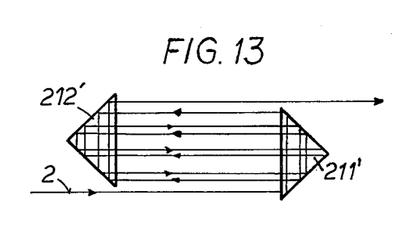
FIGS. 13 – 15 diagrammatically show several modifications of the adjustable delay means of FIGS. 11 and 12.
Figure 14:
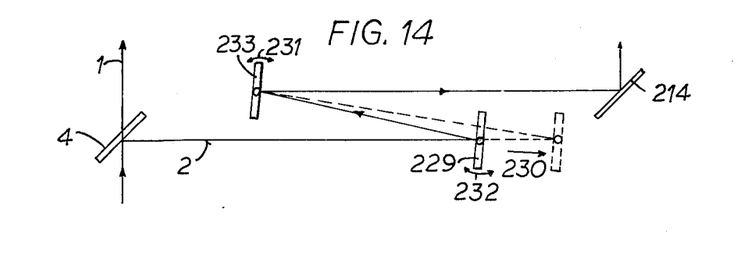
Figure 15:
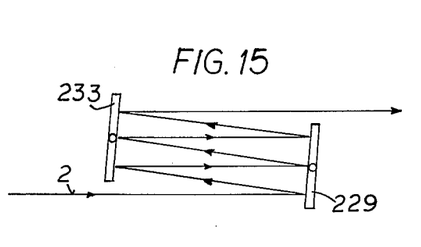

In FIG. 14 the prisms of FIGS. 11–13 have been replaced by a pair of confronting mirrors 229 and 233, mirror 229 being shiftable along the axis of beam 2 as indicated by an arrow 230. In addition, for the purpose of maintaining a constant angle of incidence at mirror 214, the two confronting mirrors 229 and 233 are jointly swingable as indicated by arrows 231 and 232. FIG. 15 shows that these two mirrors could also be so positioned as to allow for multiple back-and-forth reflections of the beam therebetween.

Figure 16:
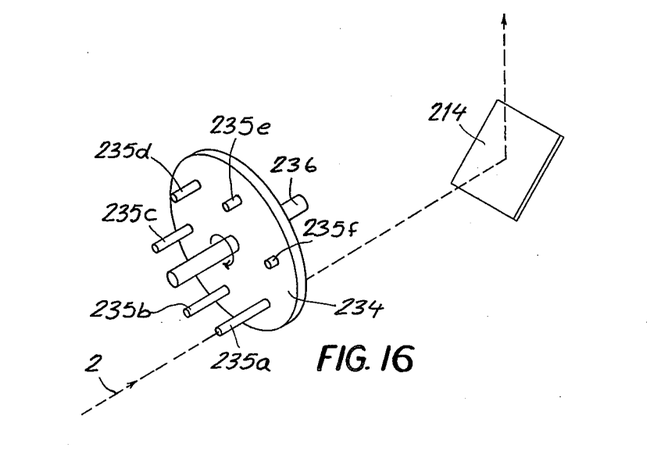
FIG. 16 is a perspective view of an alternate optical delay device to be used in my present system.

An alternate optical delay device, to be used in lieu of the adjustable reflectors of FIGS. 11–15, has been illustrated in FIG. 16. A disk 234, rotatable about a shaft 236 parallel to the axis of beam 2, carries a multiplicity of elongate refractive elements 235a–235f of the type described hereinabove, these elements differing from one another in their retarding effect upon the beam 2 with which they can be selectively aligned. Suitable indexing means, not shown, may of course be used to arrest the disk 234 in any of its working positions.

I claim:

1. A holographic-interferometric system for analyzing changes in the condition of an object having a diffusely reflecting surface, comprising:
    evaluating means provided with a receiving surface;
    a source of coherent light forming an illuminating beam and a reference beam;
    first optical means in the path of said illuminating beam defining a point of divergence between said source and said object;
    reflecting means arranged at a first location substantially coinciding with said point of divergence for directing said illuminating beam onto said object, said reflecting means having a highly reflective region;
    second optical means in the path of light rays reflected by said object for forming an image of said object on said receiving surface, said second optical means having an aperture stop with an opening and imaging said point of divergence and said highly reflective region at a second location substantially coinciding with the center of said opening, the image of said highly reflective region being smaller than said opening; and
    third optical means in the path of said reference beam for directing said reference beam onto said receiving surface for forming a field of interference between said reflected rays and said reference beam;
    said evaluating means including means for storing and superposing holograms corresponding to different conditions of said object.

2. A system as defined in claim 1, further comprising collimator means positioned between said reflecting means and the location of said object, said collimator means having a focal point coinciding with said point of divergence.

3. A system as defined in claim 1 wherein said first optical means comprises an objective defining an optical axis, said reflecting means including a mirror in line with said optical axis.

4. A system as defined in claim 1 wherein said second optical means comprises first objective means and second objective means spaced along a common optical axis, said first objective means being relatively close to the location of said object and forming a first image of said object at an intermediate position between said first and second objective means, said second objective means being relative remote from said location and forming an image of said first image on said receiving surface.

5. A system as defined in claim 1 wherein said third optical means focuses said freference beam substantially upon the image of said point of divergence.

6. A system as defined in claim 1 wherein said third optical means defines a focal point of said reference beam, an image of said focal point coinciding with an image of said point of divergence.

7. A holographic-interferometric system for analyzing changes in the condition of an object having a diffusely reflecting surface, comprising:
    evaluating means provided with a receiving surface;
    a source of coherent light forming an illuminating beam and a reference beam;
    first optical means in the path of said illuminating beam defining a point of divergence between said source and said object;
    second optical means in the path of light rays reflected by said object for forming an image of said object on said receiving surface, said second optical means having an aperture stop centered substantially at said point of divergence;
    reflecting means arranged at a location substantially coinciding with said aperture stop, said reflecting means having an opaque portion smaller than the size of said aperture stop; and
    third optical means in the path of said reference beam for directing said reference beam onto said receiving surface for forming a field of interference between said reflected rays and said reference beam;
    said evaluating means including means for storing and superposing holograms corresponding to different conditions of said object.

8. A system as defined in claim 7 wherein said third optical means defines a focal point of said reference beam, an image of said focal point coinciding with an image of said point of divergence.

9. A holographic-interferometric system for analyzing changes in the condition of an object having a diffusely reflecting surface, comprising:
evaluating means provided with a receiving surface;
a source of coherent light forming an illuminating beam and a reference beam;
first optical means in the path of said illuminating beam defining a point of divergence between said source and said object;
second optical means in the path of light rays reflected by said object, said second optical means having an aperture stop and forming an image of said object on said receiving surface;
reflecting means directing said illuminating beam onto said object while partially transmitting said light rays reflected by said object, said reflecting means comprising a partially reflecting and partially transmitting dividing surface disposed between said receiving surface and said object and imaging said point of divergence at a location substantially coinciding with the center of said aperture stop; and
third optical means in the path of said reference beam for directing said reference beam onto said receiving surface for forming a field of interference between said reflected rays and said reference beam.

10. A system as defined in claim 9, further comprising collimator means positioned between said reflecting means and the location of said object, said collimator means having a focal point coinciding with said point of divergence.

11. A system as defined in claim 9 wherein said first optical means comprises an objective defining an optical axis, said reflecting means including a mirror in line with said optical axis.

12. A holographic-interferometric system as defined in claim 9 wherein said third optical means focuses said reference beam substantially upon said point of divergence.

13. A system as defined in claim 9 wherein said aperture stop comprises a diaphragm imaged at said point of divergence by at least a component of said second optical means.

* * * * *